US006991300B2

(12) United States Patent
Colegrove

(10) Patent No.: US 6,991,300 B2
(45) Date of Patent: Jan. 31, 2006

(54) OPTIMUM COMPACTION LOW VOID COMPOSITE BICYCLE WHEEL RIM

(76) Inventor: James Colegrove, 623 N. Ferry Dr., Lake Mills, WI (US) 53551

( * ) Notice: Subject to any disclaimer, the term of this patent is extended or adjusted under 35 U.S.C. 154(b) by 0 days.

(21) Appl. No.: 10/632,727

(22) Filed: Jul. 31, 2003

(65) Prior Publication Data

US 2004/0021366 A1 Feb. 5, 2004

Related U.S. Application Data

(60) Provisional application No. 60/400,193, filed on Jul. 31, 2002.

(51) Int. Cl.
  B60B 25/00 (2006.01)
  B60B 1/02 (2006.01)
  B62L 1/06 (2006.01)
(52) U.S. Cl. .............. 301/95.103; 301/55; 188/24.13
(58) Field of Classification Search .......... 301/55, 301/58, 95.101–95.108, 95.11, 99, 6.9, 64.701, 301/64.702; 294/501, 510, 511–512, 516, 294/523, 544–546, 553; 188/24.11, 24.1
See application file for complete search history.

(56) References Cited

U.S. PATENT DOCUMENTS

| | | | |
|---|---|---|---|
| 509,261 A * | 11/1893 | Stall ...................... 301/95.107 |
| 578,292 A * | 3/1897 | Johnson ................ 301/95.103 |
| 3,732,951 A | 5/1973 | Hata et al. |
| 4,030,754 A | 6/1977 | Merlette |
| 4,314,964 A | 2/1982 | Ferrary |
| 4,483,729 A | 11/1984 | Fujisaki et al. |
| 4,741,578 A | 5/1988 | Viellard |
| 4,749,235 A * | 6/1988 | McDougall ............ 301/64.703 |
| 4,832,414 A * | 5/1989 | Jones .................... 301/64.703 |
| 4,919,490 A | 4/1990 | Hopkins et al. |
| 4,930,843 A | 6/1990 | Lewis |
| 4,938,540 A | 7/1990 | Sacks |
| 4,995,675 A | 2/1991 | Tsai |
| 5,056,630 A * | 10/1991 | Fujii et al. .............. 188/24.13 |
| 5,061,013 A | 10/1991 | Hed et al. |
| 5,080,444 A | 1/1992 | Hopkins et al. |
| 5,249,846 A | 10/1993 | Martin et al. |
| 5,277,479 A | 1/1994 | Koyama et al. |
| 5,282,673 A | 2/1994 | Koyama et al. |
| 5,452,945 A | 9/1995 | Schlanger |
| 5,540,485 A * | 7/1996 | Enders ...................... 301/104 |
| 5,549,360 A | 8/1996 | Lipeles |
| 5,603,553 A * | 2/1997 | Klieber et al. ........... 301/37.41 |
| 5,624,519 A | 4/1997 | Nelson et al. |
| 5,692,764 A | 12/1997 | Klein et al. |
| 5,707,114 A | 1/1998 | Schlanger |

(Continued)

FOREIGN PATENT DOCUMENTS

FR 2573012 5/1986

(Continued)

Primary Examiner—Russell D. Stormer
Assistant Examiner—Jason R. Bellinger
(74) Attorney, Agent, or Firm—David C. Brezina; Barnes & Thornburg LLP

(57) ABSTRACT

A fiber reinforced plastic bicycle wheel rim having an aerodynamic section is formed of two mating halves, without additional structural reinforcing members, using laminations of layers of unidirectional fibers crossing one another and having semicircular layers of non-crossing fibers orientated parallel to a point of tangency, the non-crossing layers being proximate tire well apexes and the spoke bed, including, in a preferred embodiment, a lamination of machinable materials at the braking surfaces.

6 Claims, 3 Drawing Sheets

U.S. PATENT DOCUMENTS

| | | |
|---|---|---|
| 5,779,323 A | 7/1998 | Burrows |
| 5,941,606 A * | 8/1999 | Chen .......................... 301/30 |
| 5,944,932 A | 8/1999 | Klein et al. |
| 5,975,645 A | 11/1999 | Sargent |
| 5,985,072 A | 11/1999 | Finck et al. |
| RE37,171 E | 5/2001 | Busche et al. |
| 6,270,104 B1 | 8/2001 | Nelson et al. |
| 6,283,557 B1 * | 9/2001 | Okajima et al. ....... 301/95.104 |
| 6,340,509 B1 | 1/2002 | Nelson et al. |
| 6,347,839 B1 | 2/2002 | Lew et al. |
| 6,398,313 B1 | 6/2002 | Lew |
| D462,042 S | 8/2002 | Bernardi |
| 6,520,595 B1 | 2/2003 | Schlanger |
| 2002/0033635 A1 | 3/2002 | Meggiolan |
| 2003/0107260 A1 | 6/2003 | Ording et al. |

FOREIGN PATENT DOCUMENTS

WO    WO 2004074081 A2 *   9/2004

* cited by examiner

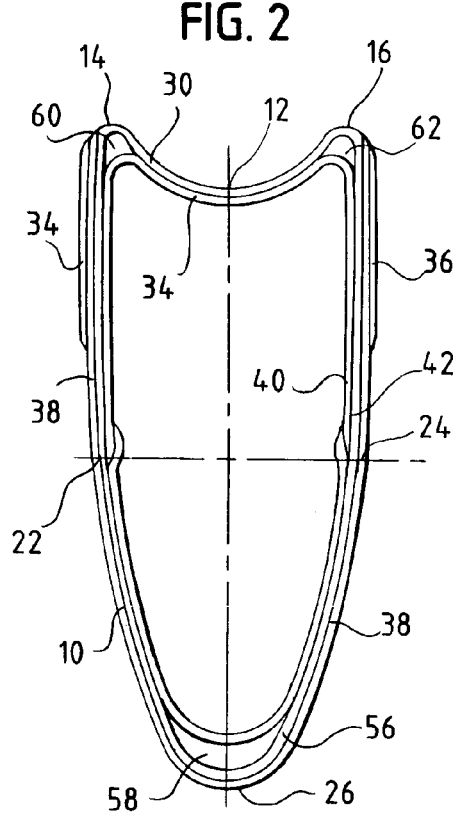
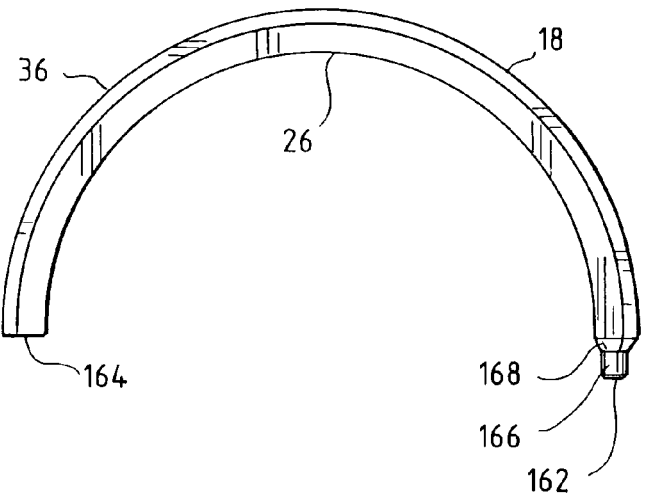
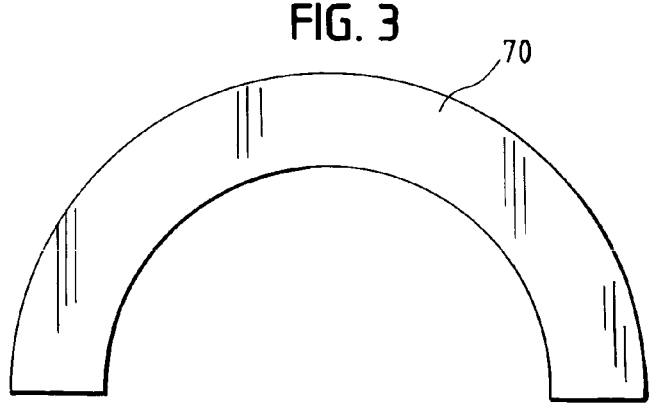
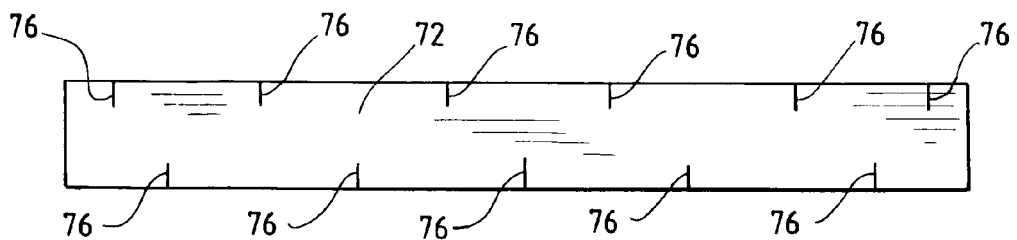
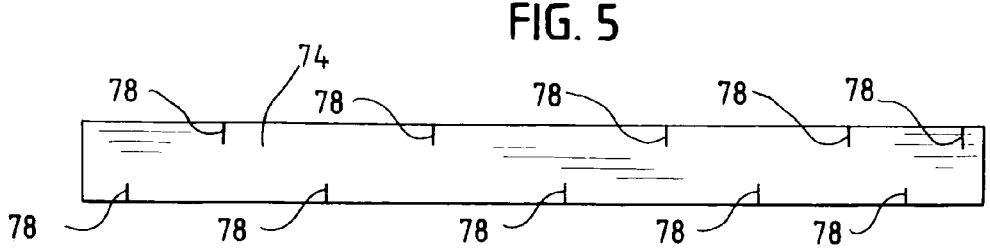

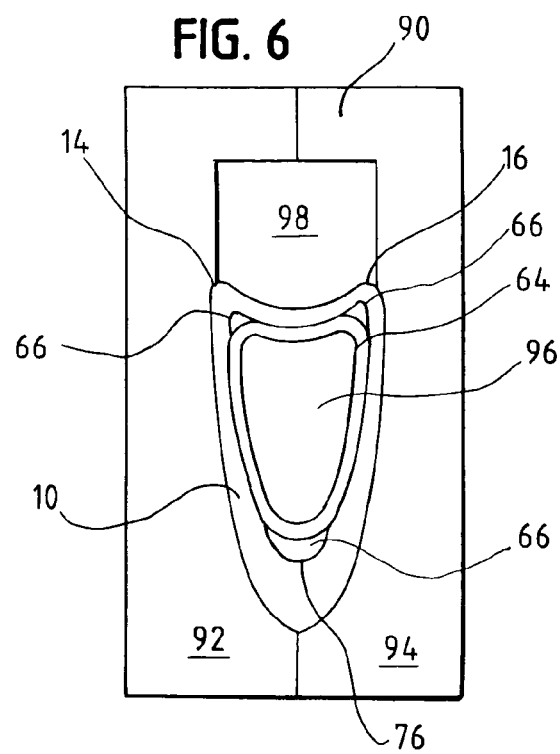
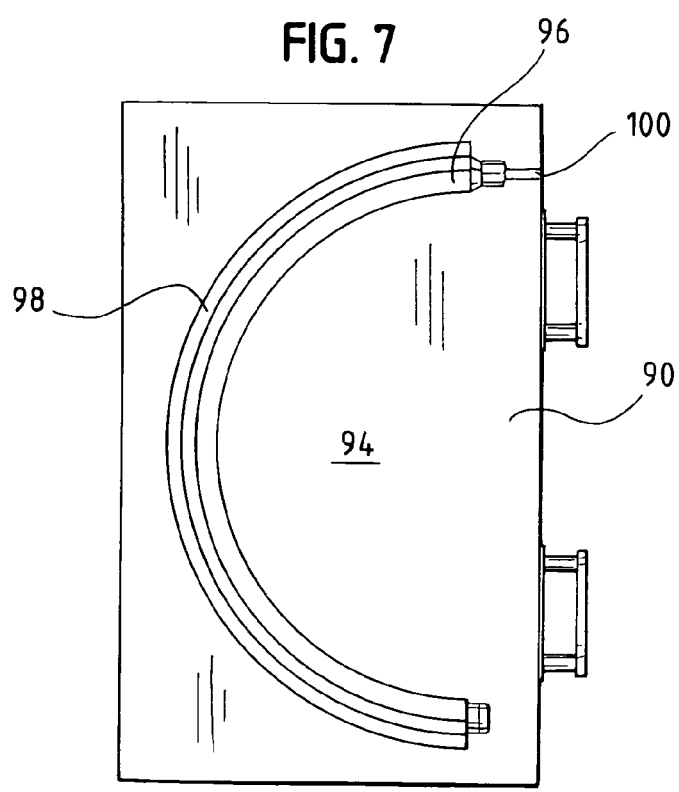

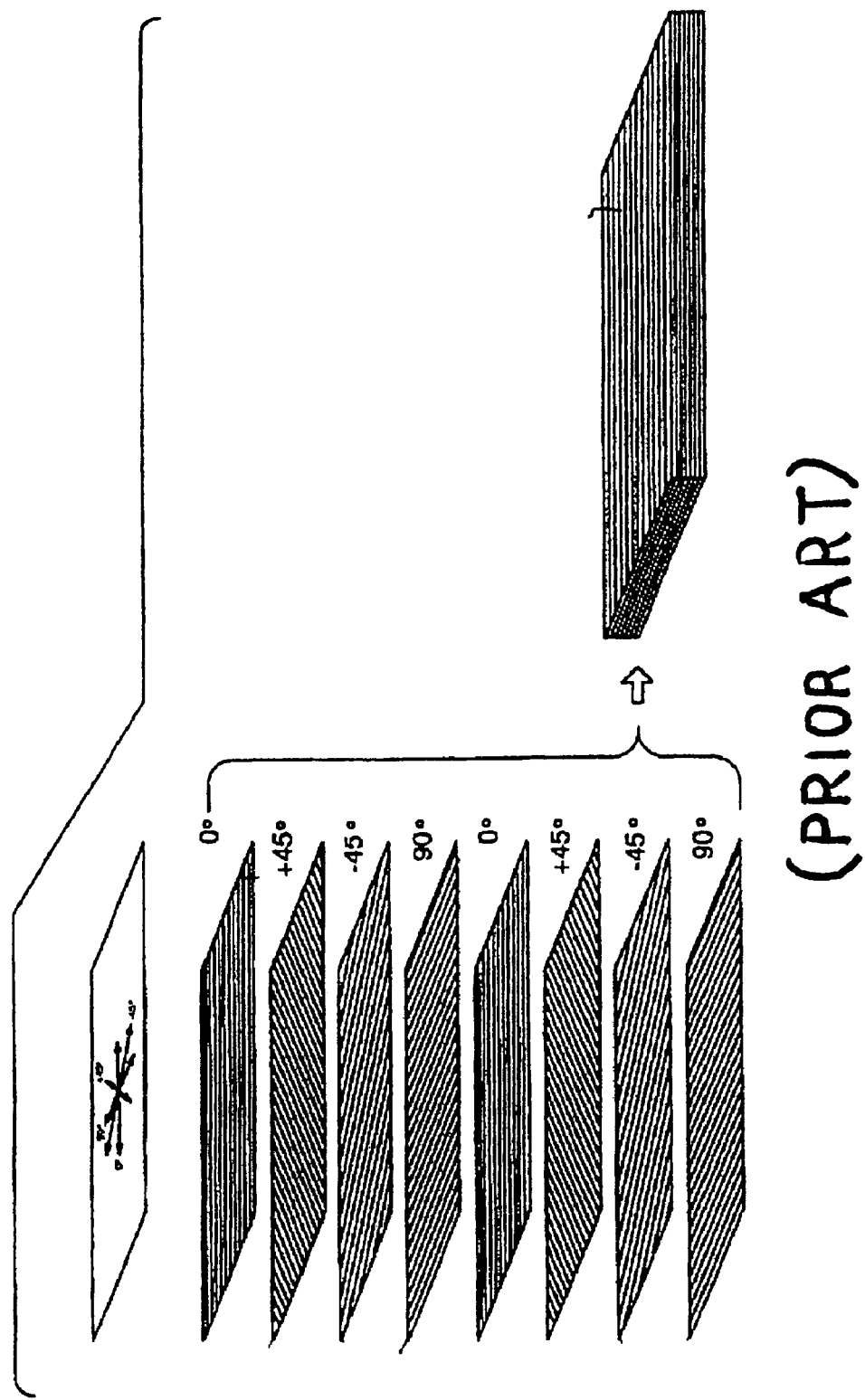

OPTIMUM COMPACTION LOW VOID COMPOSITE BICYCLE WHEEL RIM

CLAIM OF PRIORITY

Priority is claimed based on U.S. Provisional Patent Application Ser. No. 60/400,193 filed Jul. 31, 2002 and having the same title and inventor as this application.

BACKGROUND OF THE INVENTION

1. Field of the Invention

The invention is an improved two-piece bicycle wheel rim having integral mating portions and improved composite layup providing lighter weight and increased strength in an economical manner without separate joining or reinforcing pieces.

2. Description of Related Art

Basic principles of optimum compaction low void composite molding the bicycle industry are described in U.S. Pat. Nos. 5,624,519 and 6,270,104, sharing a common assignee with this application. The disclosures in U.S. Pat. Nos. 5,624,519 and 6,270,104 are incorporated by reference as if fully set forth herein.

Metal wheel rims have long been made by bending a straight extrusion, bar or other shape to a circular form and then joining the ends to make a closed circle. Typical joining may include inserts such as U.S. Pat. No. 4,938,540, plugs of metal or even wood, or by welding as in European Patent Office Publication No. 0579525A1. These patents are incorporated by reference as fully set forth herein.

Owing to the different strength properties of composite fiber reinforced plastics, particularly the high tensile strength and high stiffness of materials such as carbon fiber, the base material is formed to shape prior to curing. Three typical methods of forming a wheel or wheel rim from carbon fiber reinforced plastic are known. These include a cored composite in which the high strength skin surrounds a core such a foam core, U.S. Pat. No. 5,061,013, a solid composite such as U.S. Pat. 6,347,839 B1 in which composite laminations have no designed end openings or different density materials between interior and exterior surfaces and a partially hollow but plugged construction such as U.S. Pat. No. 6,398,313 B1 where two hollow halves have interior inserts and exterior reinforcements at joining ends. The disclosures in these three patents are incorporated by reference as if fully set forth herein.

The invention avoids the drawbacks of the prior art using general principles of optimum compaction low void composite construction specially adapted to the unique shape and structural requirements of wheel rims using a combination of laminates incorporating fibers at different angles relative to one another, a curved auto-centering plug in one half at one end mating with a receptacle in an opposite, identical half further using unidirectional layers in key areas of the rim edges and spoke bed. A preferred embodiment further combines the preferred carbon fiber reinforced epoxy laminate structure with machinable and tough braking surface portions.

BRIEF DESCRIPTION OF THE DRAWINGS

FIG. 1 is a top plan view of one half of the wheel rim.

FIG. 2 is a sectional view showing the laminate schedules schematically.

FIG. 3 is a plan view showing a sidewall lamination.

FIG. 4 is a plan view showing a wide tire well lamination.

FIG. 5 shows a narrow tire well lamination.

FIG. 6 shows the bladder and pressure intensifier arrangement.

FIG. 7 shows a mold for forming a wheel rim in accordance with the invention.

FIG. 8 is a flow schematic illustrating a process that is utilized to construct uncured composite preforms or mats (which, for example, are trimmed to the shapes shown in FIG. 3 in the case of the sidewall lamination) that are subsequently molded and precured as disclosed herein to produce the wheel of the invention.

DETAILED DESCRIPTION OF THE PREFERRED EMBODIMENT

A wheel rim 10 is formed of fiber reinforced plastic resin. Preferably this is formed predominantly of a high modulus fiber, such as carbon fiber, in an epoxy matrix, with special structural locations containing other fibers commensurate with needs in areas having unique performance and/or manufacturing requirements, such as brake surfaces. Thus, strong, but more easily machinable fibers, such as glass can be used in certain areas, and tougher fibers, such as Kevlar, can be used in high impact areas.

The fibers are aligned in laminations such as taught in U.S. Pat. Nos. 5,624,519 and 6,270,104 sharing a common assignee with this application. By using a series of 0–45–90 degree alignments, the high strength and high modulus properties of carbon fiber can be used to advantage to produce a shape of complex curvature having substantially uniform strength in the needed directions in the finished structure, while the optimum compaction and low void methods, as improved for wheel rims as taught herein, produces the finished structure having a substantially uniform density. Optimum fiber areal weights substantially above the industry standards are also permitted by the product and process taught herein.

Rim 10 as shown as a high performance road racing rim adapted to receive a conventional glued-on "tubular" or "sew-up" tire in which the tire and tube are formed together as a unit and this unit is adhesively affixed to the tire well 12 and further mechanically held in place by virtue of the inflation pressure in the tube, compressing the unit around the rim 10. As shown in FIG. 1, rim 10 is formed in halves as will be more fully described below.

Tire well 12 extends between left and right apexes 14, 16. These apexes 14, 16 are slightly radiused while the well 12 is smoothly curved with a dimension corresponding to that needed to receive a high performance "sew-up" tire with a diameter of around one inch, typically 21 to 28 mm. Sharp changes in curvature in tire well 12 are avoided to maximize utilization of standard tires and to maximize their adhesion and other performance.

Extending downwardly from apexes 14, 16 are braking surfaces 18, 20 which join left and right walls 22, 24. Walls 22, 24 then join at spoke bed 26. The curvature of spoke bed 26 and walls 22, 24 substantially conforms to the trailing two thirds of an aerodynamic foil shape having a thickness of about 20 mm and a chord of about 40 mm, recognizing that the braking surfaces 18, 20 are substantially flat and slightly less than 20 mm across.

Keeping in mind that specific lamination schedules are generally in accordance with the teachings of the aforementioned US. Pat. Nos. 5,624,519 and 6,270,104, certain wheel rim advantages are shown in the schematic arrangements of laminations. It will be understood that each individual lamination described is itself comprised of component unidirectional fiber layers arranged at 0–45–90 degrees relative to one another.

Tire well 12 is formed of an outer lamination 30 and an inner lamination 32. Laminations 30, 32 overlap apexes 14, 16 and extend under braking surfaces 18, 20.

Braking surface laminations 34, 36 can advantageously use fibers of composition different from high strength, high modulus carbon for several reasons, both with or without portions of carbon fiber. Braking surfaces 18, 20 perform best when used in conjunction with the highly developed bicycle caliper brakes, when surfaces 18, 20 are machined to a high level of smoothness and trueness.

Other fibers, relative to carbon fiber, have improved properties in ease of machining and improved wear on the tools used to machine fiber reinforced plastics which use them. Brake surfaces 18, 20 are also subject to wear and damage when in use, particularly as a result of contamination by foreign objects such as sand, stones, road tar and the like. Other materials have greater toughness than carbon fiber, thus other materials may be substituted. Finally, the surfaces presented by a machined fiber reinforced plastic using materials other than carbon fiber may have more optimum coefficient of friction with typical elastomeric caliper brake shoes, thus other materials may be substituted. Glass reinforced plastic has been used successfully in these areas. Other reinforcements having improved machinability, toughness and frictional properties may also be used. Typical fiber reinforcement may include Kevlar, glass, ceramic, other plastics such as a nylon, Spectra, Vectran or other high temperature plastic, or metals such as aluminum or ferrous metals. Similarly, outer layer 30 is the most vulnerable to road contact damage and might also obtain advantage from the use of alternative materials, either as a layer or layers, or as individual fibers combined with carbon fibers in a custom layer.

Considerations in forming the brake wall areas are to include fiber reinforcement in outer plies of a lamination, including an added lamination or bonding a separate piece such as a ring made of Aluminum or some other sheet material.

Spoke bed 26 and walls 22, 24 are formed of overlapped inner lamination 40, outer lamination 38 and middle lamination 42. Laminations 38, 40 and 42 effectively form an all carbon fiber reinforced plastic sandwich with voids therebetween eliminated by the compaction process. If each lamination uses, for example, eight unidirectional plies with their fibers oriented at 0–45–90 degrees relative to one another, 24 ply quasi-isotropic walls would be formed. Indeed, quasi-isotropic properties would result from as few as four plies, per lamination, with the described fiber orientation.

Outer layer or lamination 38 is actually formed from two mirror image semicircular shapes 70, as shown in FIG. 3, butted at the bottom of the rim 10. Bottom inner layer 54 and bottom middle layer 56 bridge the joint between the two portions of lamination 38. Braking surface laminations 34, 36 are laid outward of laminations 38.

Three "0 degree" bundles of fibers are included in the preferred embodiment. Between layers 54 and 56 spoke bed is captured "0 bundle" 58. Left apex "0 bundle" 60 and right apex "0 bundle" 62 are captured between layers 30, 32 at each tire well apex. These bundles, 58, 60, 62 perform important structural functions. As described above, apexes, 14, 16 and spoke bed 26 are highly loaded. The term "0 bundle" is used to describe, in these three locations, straight fiber bundles with no crossing orientation. These bundles are formed in respective circles at apexes 12, 14 and spoke bed 26 such that the individual fibers present themselves parallel to the direction of travel of the bicycle at the point of tangency, or contact of the tire with the road surface, and perpendicular to the spokes. No substantial side component is present in the orientation of these layers, as compared to the 0–45–90 orientation of the laminations 30, 32, 34, 36, 38, 40, 42, 54 and 56 which form the balance of the structure. Thus, strength and stiffness is specifically applied in desired directions relative to the road surface and the spokes.

Further, these bundles, 58, 60, 62 are readily compressed in the complex shape of a hollow wheel rim 10 which will enable substantial elimination of voids between laminations 30, 32, 34, 36, 38, 40, 42 54 and 56 and bundles 58, 60, 62 by application of pressure to a bladder 64. For ease of manufacture, the geometry described herein permits the use of a bladder 64 formed of a simple tube, with the auxiliary use of pressure intensifiers 66 proximate apexes 14, 16 and spoke bed 26. Pressure intensifiers 66 are preferably formed of simple arc sectioned ribbons of silicone, or some other suitable elastomer that conforms to shape, tends to expand when heated and does not permit epoxy adhesion.

As bladder 64 and pressure intensifiers 66 are used at high temperatures and pressures in close contact with epoxy impregnated laminations, the use of economical and easily replaceable bladders 64, and intensifiers 66 yields a functionally superior, yet economically feasible molding method.

Rim half 160 is formed with a male plug 162 and a female receptacle 164 so that two identical halves can be matingly interconnected and glued to form a single rim 10. It will be noted that plug 162 has a projecting arc portion 166 and a tapered neck portion 168. These fit corresponding machined shapes in receptacle 164. Neck 168 provides a centering effect to insure precise alignment of the two halves and maintains an adequate glue thickness. Epoxy can preferably be used as an adhesive, and performs best when a uniform thickness coats the mating portions 162, 164. Further, uniform thickness, especially given the arc shape of portions 162, 164 is particularly important in a wheel rim to avoid any slight imbalance that would be caused by inconsistent quantities of epoxy used as adhesive. Forming the complex arced, mating portions 162, 164 is a particular advantage in the optimum compaction, low void molding process used herein.

Semicircular lamination 70 and layups 72, 74 are shown for illustration of the formation of rim 10. In fact, depending on the specific schedule of laminations, a variety of different combinations and configurations can be used consistent with the teachings herein. Additionally reinforcing ribbons and doublers can also be used, added to specific locations in the rim, such as where spoke holes are to be machined. The overlapable layups shown have darts 76, 78 staggered such that they permit curvature of layups 72, 74 to the three dimensional shape of laminations during the molding process. The spacing of darts 76, 78 is such that dart 76 will not be located immediately adjacent dart 78, and vice versa, thereby having a length of continuous fibers in at least one of the laminations. Further, because the laminations 72, 74 will be curved, the opposed edges of darts 76, 78 will overlap one another, providing further fiber strengthening when compacted and cured in an epoxy matrix.

Laminations 30, for example can be formed of a somewhat wider layup 72 when compared to lamination 54 because of they width of tire well 26. The specific layup width will also depend on the size of the rim, such as a 21 mm rim v. a 25 mm wide rim, and the configuration, such as an aerodynamic section shown, or a minimum weight section which might have a shorter chord. Rim diameter will also be a factor. Typically, lamination 38 will be the semicircular form 70, while laminations 30, 32, 54, 56 will be one of the flat layups 72, 74, with dimensions adjusted based on rim configuration.

Braking surfaces 18, 20 may have their own individual semicircular layups. As described above, these may advantageously use a variety of fiber or cloth laminations. Alternatively, a single circular bonded ring, such as formed of metal could also be used. Further, separate braking surfaces may be dispensed with in rims for certain conditions Thus, for certain competitive conditions, such as a clean flat race course in good weather, special braking surfaces may be dispensed with, while for difficult conditions, such as poor weather or mountainous courses requiring aggressive and frequent braking, rims having special braking surfaces may be more advantageous.

Mold 90 is formed of two halves 92, 94 defining a chamber 96. In the preferred rim—for tubular tires—a solid mandrel 98 is placed in chamber 96 to define the shape for tire well 12. In alternative embodiments a different mandrel configuration could be used, such as solid, partially solid or inflatable, to define flanges to receive a clincher type tire. A conduit 100 enables communication between bladder 52 and an outside pressure source, preferably compressed air.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

In accordance with my invention, I claim:

1. A wheel rim formed of fiber reinforced plastic comprising;
   the wheel has a structural portion and left and right braking surfaces;
   said structural portion is predominantly a plurality of high modulus first fibers in a plastic matrix;
   said braking surfaces are formed of second reinforcing fibers, said second fibers having hardness properties that make said second fibers more easily machinable fibers than said first fibers, said second reinforcing fibers being integrally molded with said first reinforcing fibers in a monolithic plastic matrix;
   said high modulus first fibers are aligned in laminations formed of a series of 0–45–90 degree alignments;
   the wheel is formed in a shape of complex curvature having substantially uniform strength and having a substantially uniform density;
   the ratio of said first and second fibers to said plastic matrix in said wheel is substantially above 60%;
   said wheel has first and second substantially identical semicircular halves;
   said first half is formed so as to be integrally molded with a first male plug at one end and a first female receptacle integrally molded at the opposite end separated by an arc portion;
   said first male plug has a first tapered neck portion;
   said second half is formed so as to be integrally molded with a second male plug at one end and a second female receptacle integrally molded at the opposite end separated by a second arc portion;
   said second male plug has a second tapered neck portion;
   the wheel is matingly interconnecting and adhesively bonded, so that said first male plug bonds with said second female receptacle, and said second male plug bonds with said first female receptacle such that said first tapered neck portion substantially centers said first male plug thereby preserving adequate adhesive coating, and said second tapered neck portion substantially centers said second male plug thereby preserving adequate adhesive coating.

2. The wheel of claim 1, further comprising:
   the wheel is formed with a tire well that extends between left and right apexes;
   said apexes are radiused;
   said well is smoothly curved to receive a tire with a diameter of around one inch; extending downwardly from said apexes are left and right braking surfaces;
   said braking surfaces join left and right walls;
   said left and right walls join at a spoke bed;
   the curvature of said spoke bed and left and right walls substantially conforms in shape to the shape of the trailing two thirds of an aerodynamic foil having a thickness of about 20 mm and a chord of about 40 mm;
   said braking surfaces are substantially flat and less than 20 mm across.

3. The wheel of claim 2, further comprising:
   said tire well is formed of a first outer tire well lamination and a first inner tire well lamination, which first inner and outer tire well laminations overlap said apexes and extend under said braking surfaces.

4. The wheel of claim 3, further comprising:
   said spoke bed and walls are formed of an overlapped second inner spoke bed lamination, a second outer spoke bed lamination and a first middle lamination;
   said second inner and outer spoke bed lamination and said first middle lamination effectively form an all carbon fiber reinforced plastic sandwich with voids therebetween substantially eliminated by the compaction process;
   said second inner and outer spoke bed laminations and said first middle laminations form quasi-isotropic walls because of the directions of first fiber orientation.

5. The wheel of claim 4, further comprising:
   three 0 degree bundles of fibers are arranged aligned with the arc of the wheel at said spoke bed said left apex and said right apex.

6. The wheel of claim 3, further comprising:
   said braking surfaces are machined to a high level of smoothness and trueness;
   said braking surfaces are formed of a plastic matrix with fibers formed of materials that have greater toughness than carbon fiber;
   said machined braking surfaces have a greater coefficient of friction with elastomeric caliper brake shoes than carbon fiber reinforced plastic surfaces.

* * * * *